United States Patent Office 3,519,482
Patented July 7, 1970

3,519,482
METHOD OF PREPARING LOW D.E. STARCH HYDROLYSATES
Raoul G. P. Walon, Brussels, Belgium, assignor to CPC International Inc., a corporation of Delaware
No Drawing. Filed Oct. 10, 1967, Ser. No. 674,347
Int. Cl. C13k 1/06; C08b 25/02
U.S. Cl. 127—38
5 Claims

ABSTRACT OF THE DISCLOSURE

A procedure for preparing low D.E. starch hydrolysates by treating starches with a cation exchange resin to hydrolyze the starch to a product starch hydrolysate having a D.E. ranging from about 10 to about 45, and more often 10–40. The starch hydrolysate product is especially characterized as having a relative low ash content, essentially that of the starting basic starch material.

---

Conventionally, starch conversion syrups have been produced by the hydrolysis of starch with acids or enzymes. The primary emphasis in the preparation of commercial starch hydrolysate syrups has been on obtaining stability, clarity and non-crystallizing characteristics.

There is a large potential market for syrups and syrup solids with bland taste, low sweetness and low hygroscopicity. Their characteristics are achieved by produced low D.E. level starch hydrolysates. D.E. is an abbreviation for dextrose equivalent which is a common expression in the art for describing the total reducing sugars content of a material calculated as dextrose, and is expressed as percent dry basis. Such low D.E. syrups, and syrup solids are useful as basis for preparation of food items as well as for bodying agents and as additive having non-sweet, water-holding, non-hydroscopic characteristics. Other applications includes use as a carrier for synthetic sweeteners, as a flavor enhancer, is an additive for coloring agents, as a spray drying adjunct for coffee extracts or tea extracts, as a bulking, bodying, or dispersing agent in synthetic creams or coffee whiteners, as a moisture holding agent in breads, pastries, meats and as a bodying and smoothing agent in puddings, soups and frozen iced desserts.

Low D.E. syrup having a D.E. in the range of 10–45, and more particularly 10–40, are not practical to produce from starches by the processes of the prior art. Previous attempts to produce low D.E. syrups from starches by prior art processes have failed by way of extremely poor filtration rates, yield losses and substantial insolubility of syrup solids. In addition, considerable amounts of ash are thereby imparted to the product by the acid or enzymatic treatments. Substantial ash content is undesirable for a number of reasons. For example, presence of ash appears to enhance moisture pick-up of dried starch hydrolysates.

Correspondingly, when one desires to produce a high conversion or high sweetness corn syrup, say one having a D.E. ranging from about 45 to about 65, an acid or enzyme treatment is usually utilized, at least as an initial step to produce a low D.E. product. This first step known as thinning is most often effected by acid hydrolysis. The acid conversion step is then usually followed by treatment with saccharifying enzymes to give one the desired product. In other cases an extended acid hydrolysis is the sole treatment step. In any case, the resultant corn syrup again has a substantial ash content which must usually be lowered by carbon treatment or other appropriate purification methods. The same holds true when dextrose itself is produced from the hydrolysate product by known crystallization or evaporation techniques. The initial acid treatment step usually employed causes a problem of corrosion to the equipment being utilized and imparts an undesirable ash content to the "greens" or mother liquor resulting from the dextrose isolation. Since the mother liquor is itself utilized or further crystallized to yield additional dextrose, substantial ash quantity here is also a drawback. Again, due to the initial acid hydrolysis step the dextrose has to be washed one or more times to free it of chloride and ash content.

It would be an advance in the art if a method of making low D.E. starch hydrolysates were disclosed, which method was relatively rapid and efficient, and yielded products which had a relatively low ash content, say in the neighborhood of 0.1% or less. The low D.E. starch hydrolysate product could be utilized directly for one of the purposes set out above or others, or could be further converted such as by means of enzymes to high D.E. starch syrups or to dextrose itself. Due to low ash content and low level chloride or sulfate content, conveniently imparted to a product from hydrochloric or sulfuric acid hydrolysis, there would be less equipment corrosion, and little if any need to further purify the starch hydrolysate products by treatment with carbon absorbents or anion exchange systems to obtain demineralized products.

In view of the above, it therefore becomes the object of the invention to provide a new and improved method of making low D.E. starch hydrolysate products which are particularly characterized as having low ash contents.

Another object of the present invention is to provide novel low D.E. starch hydrolysate products from the above method. These products are characterized as being clear and stable, bland tasting and non-hygroscopic at low sweetness levels.

A still further object of the invention is to provide high D.E. starch syrups and solids by further converting a low D.E. starch hydrolysate prepared according to the process of the present invention by means of enzyme addition and the like. These syrup products likewise have minimal ash content and exhibit little tendency to corrode process apparatus used in the conversion steps.

An additional object of the invention is to produce dextrose in a more efficient manner by initially forming a low D.E. starch hydrolysate according to the dictates of the present invention, followed by further starch conversion by known techniques such as enzyme addition and terminated with the textrose isolation step. Due to the low ash and other impurities, the dextrose is in a more purified state, and the mother liquor therefrom has substantially less inorganic impurities and color bodies.

Other objects of the present invention will be apparent hereinafter from the following description and from the recitals of the appended claims.

In accordance with the present invention I have found that novel low D.E. starch hydrolysates may be formed from aqueous starch dispersions by a specific conversion treatment. This method broadly comprises the step of contacting a solution of gelatinized starch in water, or an aqueous dispersion of granular or ungelatinized starch, with a cation exchange resin for a time sufficient to hydrolyze said starch to a product starch hydrolysate having a D.E. ranging from about 10 to about 45, and more often ranges from 10 to 40. The starch hydrolysate product from this treatment has low ash content and is relatively low in inorganic anion content such as chloride. It is greatly preferred that the cationic exchange resin utilized be a strong acid cation exchange resin and particularly be used when in the hydrogen form.

In one particular embodiment the starch may be first liquefied by heat or enzyme pretreatment or by both types of treatment in sequence. Thus, for example, starch may be first liquefied with an enzyme system like alpha-amylase and converted to a D.E. of less than about 5. The thinned starch can then be converted by resort to the just described resin system while being heated.

Cation resins useful in the present invention are generally copolymers prepared by reacting styrene with varying amounts of divinyl benzene and then sulfonating the aromatic nuclei forming the polymer backbone. Examples of suitable monovinyl aromatic compounds other than styrene are alpha methyl styrene, chlorostyrene, vinyl toluene, vinyl naphthalene and homologues thereof, capable of copolymerizing. Examples of additional suitable polyvinyl aromatic compounds are divinyl toluene, divinyl xylene, divinyl naphthalene, and divinylethyl benzene.

Resins of this type are manufactured under the trade name Amberlite by Rohm & Haas or Dowex by Dow Chemical Company. Also useful in the present invention in place of the above resins are cation exchange resins obtained by condensing an aldehyde, a phenol and an organic sulfonic acid to give sulfonated polymeric resins. Other resins having the properties of the foregoing strongly acidic cation exchange resins can also be used in the present invention.

Preferred cation exchange resins are prepared by sulfonating polymeric resins derived by copolymerizing a monomer solution containing 10–20% by weight of divinyl benzene and 80–90% by weight of styrene. Most preferred resins have a divinyl content of 12–20% by weight and a styrene content of 80–88% by weight.

The first step in the invention is effected by gelatinizing an appropriate starch source. This may be done independent of the resin treatment or if granular starch is utilized occurs as an initial step in the process of the invention. Any suitable starch may be used as a starting material such as cereal starches as corn, grain sorghum and wheat, waxy starches such as, waxy milo and waxy maize, and root starches, such as potato starch and tapioca starch. The preferred starch here is corn starch.

The starch is first slurried in water to a solids concentration of between about 10% and about 65%, and more often to a dry basis solids content of 30–65%. The slurry is then solubilized by gelatinization. This may be accomplished, for example, by heating an appropriate raw starch-water slurry above the gelatinization temperature of the starch or by adding dry starch to heated water or by other similar means such as by resort to use of enzymes as alpha-amylase. Also, as just noted a granular starch source may be heated in presence of cation exchange resin. Thus, for example, the raw starch may be heated to 80–90° C. for 10–45 minutes along with a cation exchange resin to effect proper gelatinization.

The pasted starch is then initially or further contacted with a strong acid cation exchange resin in hydrogen form for a time sufficient to effect the proper degree of conversion. This time may vary considerably depending upon the mode of conversion which may either be effected batch-wise or in a continuous manner. Thus, for example, the ion exchange resin in bead or granular form may be mixed with a hot starch paste and thereby maintained in contact for the appropriate amount of time, preferably under conditions of agitation. In still another embodiment, a resin membrane may be used or a series of resin membranes whereby the hot contacted starch slurry is converted. The resin membranes may, for example, be heated by means of electric heating plates placed between the membranes. In one illustrative technique a hot slurry of resin beads and pasted starch is prepared, and the conversion effected at elevated temperatures, while agitating the slurry. Again, a column technique may be used whereby a heated column of resin is prepared and a pasted or liquefied starch solution flowed through the column in varying rates. Usually the influent batch paste is itself hot. Again, as mentioned above the pasted starch may be flowed through a series of perforated membranes or screens of cation exchange material to allow hydrolysis to the low D.E. product to proceed on a continuous basis. In still another variation of the invention a series of tubes or bundles of ion exchange material may be used to carry out the desired hydrolysis. The ion exchange bundle essentially acts as a heat exchanger.

One particularly preferred embodiment which is illustrative of the versatility of the invention involves forming a slurry of pasted starch and resin, and heating the slurry at a temperature ranging from about 100° C. to about 125° C. under a pressure of 5–30 p.s.i.g., more often 5–20 p.s.i.g., for a period of time sufficient to effect hydrolysis to the desired degree. For example, an agitated autoclave or pressure bomb may be utilized here. Usually under the above conditions of pressure and temperature the hydrolysis is completed in a period of time ranging from about 5 minutes to 180 minutes. More often the conversion time ranges from about 10 to about 100 minutes. Of course, the extent of treatment with the cation exchanger will determine the D.E. level, with prolonged treatment leading to the higher D.E. products.

The low D.E. products from the resin contact usually have a 10–45 D.E., more often have a D.E. ranging from about 10 to about 40, and most often have a D.E. of 15–25.

As mentioned above, due to the fact that mineral acid or enzyme addition is obviated the low D.E. products have relatively low ash contents. Usually ash content is in the range of 0.3% dry basis or lower prior to any further purification. In many instances, the product may be used for its desired end-use application without any further purification. In many instances a product may be obtained having an ash content of about 0.2% dry basis, that is based on starch solids present, and under optimum conditions has an ash content of about 0.1%. In essence, the salt content of the hydrolysate usually depends upon the original salt content of the starch undergoing conversion.

Under usual conditions of the process of the invention the product starch hydrolysate has a pH in water ranging from about 2 to about 3. A typical starch hydrolysate product having the just mentioned pH usually has a D.E. of about 20.

The low D.E. starch hydrolysate product usually has a solids content of 10–65% by weight, and more often ranges from about 20 to about 40% by weight. In order to produce more highly concentrated products, say those having at least a solids content of 50%, the product may be simply heated usually under a vacuum to drive off excess water and produce a more highly concentrated, and more useful starch product. It is preferred to use a syrup of higher solids content both because it is advantageous in shipping and more useful in many applications.

Likewise the resultant hydrolysate may be further refined by conventional procedures. Further refining steps particularly aid in yielding starch syrups substantially haze-free and highly soluble in water. Thus, for example, the hydrolysate may be refined by treatment with vegetable carbon, or ion exchange resins, or by filtration, centrifugation and the like procedures.

Again the low D.E. starch syrup may be dried by conventional means to yield syrup solids. For example, the syrup may be spray dried to yield the desired solid product. These syrup solids are particularly characterized by low hygroscopicity and high water solubility.

The hydrolysates prepared according to the present invention have particular advantages over those prepared by acid hydrolysis alone. By the latter technique clear haze-free hydrolysates are not furnished since they could not be filtered in any appreciable rate after conversion. Likewise, in the acid hydrolysis technique after filtration was achieved the clarified hydrolysates soon exhibited a haze formation, often become completely opaque in a short amount of time. Lastly, as mentioned above the product hydrolysates contained substantial ash and other impurities, at least relative to products obtained via the instant invention.

In another preferred embodiment of the invention the pasted starch prior to heat contact with strong acid cation exchange resin in hydrogen form is decationized. During this step hydrolysis does not take place but rather the sodium and other cations of the starch are exchanged, and the pH lowered, say within a range of 2–4. This step of decationizing the starch base prior to the hydrolysis reaction tends to accelerate the hydrolysis and effect a more ready conversion in greater yields. The decationized starch is then preferably washed to remove free acids and the pH is raised to 4–6.5 preparatory to cation exchange treatment. The strong acid cation exchange resins in hydrogen form of the type described above are eminently suitable in this pretreatment step. Usually this step is carried out at room temperature or slightly above by means of a resin column or bed.

In yet another embodiment the low D.E. starch hydrolysate product is further treated with an anion exchanger whereby the pH is made more neutral and anions removed. This step particularly aids in creating proper conditions for further treatment by saccharifying enzymes.

The above described products within the lower D.E. range may be further converted by hydrolysis to high D.E. starch syrups such as by well known enzymatic procedures. Thus, for example, high sweetness starch syrups having a D.E. ranging from about 45 to about 95 may be prepared by first following the techniques of the present invention in making a low D.E. initial hydrolysate, and then further converting to the desired D.E. level. For example, the low D.E. starch hydrolysate prepared according to the present invention may be then saccharified by enzyme hydrolysis. Typical saccharifying enzyme may be derived from members of the *Aspergillus niger* group. Preparations and conditions of its use are described in U.S. Pats. 2,893,921; 3,012,944; 3,042,584; and 3,264,193. However, any suitable enzyme preparation capable of saccharification may be used to further hydrolyze the starting low D.E. starch hydrolysate product. Enzymes of this type include alpha-amylase and glucamylase which may be of cereal, animal, or microbiological origin, such as, for example, fungus, rhizopus, etc. These high D.E. starch hydrolysate products likewise are characterized by relatively low ash content and a relatively low degree of impurity level. Again, like the low D.E. products the high sweetness starch syrups have excellent color due to reduced tendency of formation of color bodies in the initial conversion step. Further, due to the relatively low ash content the high D.E. products like those of the precursor low D.E. type are more easily refined by carbon treatment and the like, and in many instances need no further refinement whatsoever.

If desired, the low D.E. products of the invention may be hydrolyzed as completely as possible to produce dextrose, having say a D.E. of at least 90 or even 95 or above. Again, enzymatic procedures of the type described above are useful here. Due to low anion and ash content the dextrose is purified with less washing than is customary. Again, the "greens" or mother liquor from the dextrose isolation contains substantially less ash and other impurities than is normally found in dextrose mother liquor produced via conventional techniques.

The primary reason for low ash content of low D.E. starch hydrolysate products of the invention is that the hydrolysis can be effected at a relatively high pH range, say 2–4 and more often within a pH range of 3–3.5. Thus, minimal amounts of base must be later added in neutralization of the final product. In many instances the pH level need not be adjusted at all by base addition. Again, since no acid such as hydrochloric or sulfuric acid need be added in the process of making low or high D.E. products as desired, impurity levels of unwanted anions in the final products will be low, and if necessary completely removed by anion exchange treatment. For example, chloride content will be exceptionally low, leading to a situation of materially reduced corrosion rate in the process equipment. Even in the case of a process involving enzyme treatment, substantial inorganic and organic impurities are introduced into the product by the enzyme preparation addition. This is in contradistinction to the present process wherein no extraneous materials are introduced into the reaction mass during hydrolysis.

The following examples illustrate typical starch conversion techniques carried out in accordance with the directions of the invention. It is understood, of course, that these particularly described runs are merely illustrative, and that the invention is not to be limited thereto.

EXAMPLE I

A raw corn starch slurry is first gelatinized to produce a starch paste by addition of 20% of a strong acid cation exchange resin in hydrogen form based on dry weight of the starch. Gelatinization was effected in an autoclave and the gelatinized starch-resin mixture had a Baumé of 18° and pH of 5.9. This exchanger was prepared by sulfonating a 16% divinyl benzene-84% styrene copolymer. Then, the resin-starch mixture was further autoclaved with constant agitation under pressure. The conversion was effected by raising the pressure in the autoclave to about ½ atmosphere (about 7 p.s.i.g.) for a period of 25 minutes. The pressure was then held at this level for an additional 15 minutes, and thereafter raised to 1 atmosphere over a period of 15 minutes. The desired D.E. level was then achieved by holding the starch-resin mixture at 30 minutes at the 1 atmosphere level.

The product was then blown off and the resin separated by a sieve. The product had the following characteristics.

Baumé—20.2°
pH—2.4
D.E.—17.9
Ash—0.1%
Dextrose—3.1%

EXAMPLE II

This run was effected essentially according to directions of Example I with the exception that the starting gelatinized starch-resin mixture had a Baumé of 17.8° and a pH of 5.1. Also, demineralized water was used instead of municipal water to make up the starch paste. The autoclave was raised to a temperature of slightly less than 1 atmosphere over a period of 25 minutes and then held at this point for a period of 40 minutes. The converted product had the following characteristics.

Baumé—19.9°
pH—2.5
D.E.—10.9
Ash—0.085%
Dextrose—1.0%

EXAMPLE III

Again, the technique outlined in Example I was essentially followed with the exception that the starting starch-resin mixture had a Baumé of 17.5° and a pH of 4.8. The autoclave was heated to a pressure of slightly less than 1 atmosphere over a period of 10 minutes and then held at this pressure for 45 minutes.

The starch hydrolysate product had the following characteristics.

Baumé—18.7°
pH—2.4
D.E.—20.6
Ash—0.1%
Dextrose—4.6%

The ash level was essentially the same as that of the starting starch material.

EXAMPLE IV

In still another example the starch suspension was first run through a cation exchanger in hydrogen form at a temperature of 45–50° C. The decationized starch was dewatered by centrifugation and then washed with substantially iron-free water. The decationized starch was then placed in suspension in demineralized water and then converted essentially according to directions of Example I. The converted starch product analyzed approximately as those set out above, but in this instance was much lower in ash content after conversion.

The low D.E. starch hydrolysates of this invention, whether in the form of dilute or concentrated syrups, or in the form of dry solids having a moisture content of less than 15% and preferably about 4%, are characterized by blandness of taste and low sweetness, and they are nonhygroscopic. They are fully and readily soluble in water. When used in food products, they have a minimal effect upon flavor, while providing bulk and stability.

These characteristics make the products of the invention particularly suitable for applications such as, for example, carriers for synthetic sweeteners, flavors, coloring agents and essences; spray drying adjuncts for coffee extracts and tea extracts; bulking, bodying, and dispersing agents in synthetic creams or coffee whiteners; ingredients promoting moisture retention in bread, pastry, and meats; and as components of dry soup mixes, bakery mixes, frosting mixes, spice mixes and blends, beverage powders, condiments, gravy mixes, sauce mixes, and frozen dairy foods. In addition, they are useful in the formulation of anticaking agents, tableting compounds, whipped products, protective coatings agglomeration aids, and low- or reduced-in-calorie foods and beverages.

When the starch hydrolysate products, or syrups or syrup solids of the invention are used as solutions, at a solids concentration of less than about 40% by weight, they are particularly attractive because of their bland flavor, low hygroscopicity, low sweetness, and ready solubility. They impart density and good mouthing characteristics without noticeably affecting viscosity or flavor. At solids concentrations above about 40%, the solutions contribute significantly to the viscosity characteristics of any system in which they are employed.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

The invention is hereby claimed as follows:

1. A method of preparing a low D.E. starch hydrolysate which comprises: contacting an aqueous starch slurry having a solids content from about 10% to about 65% with a strong acid cation exchange resin at a temperature from about 100° C. to about 125° C., and at a pressure from about 5 p.s.i.g. to about 30 p.s.i.g., for a period of time from about 5 minutes to about 180 minutes to effect hydrolysis of the starch, and recovering a low D.E. starch hydrolysate product having a D.E. from about 10 to about 45 and containing less than about 0.3% ash, by weight dry basis.

2. A method as in claim 1 wherein said resin is a sulfonated copolymeric resin derived from a divinyl benzene-styrene copolymer.

3. The method of claim 1 wherein the starch prior to contact with the strong acid cation exchange resin is gelatinized.

4. The method of claim 1 wherein said starch undergoing treatment is in granular form and exists as an aqueous dispersion.

5. The method of claim 1 wherein said starch is corn starch.

References Cited

UNITED STATES PATENTS

| | | | |
|---|---|---|---|
| 2,203,324 | 6/1940 | Copland | 127—38 |
| 2,822,303 | 2/1958 | Campbell | 127—38 |
| 2,891,869 | 6/1959 | Langlois | 127—38 X |
| 2,965,520 | 12/1960 | Snyder | 127—38 |
| 3,067,066 | 12/1962 | Ehrenthal | 127—38 |
| 3,285,776 | 11/1966 | Scallet | 127—38 X |

OTHER REFERENCES

W. H. Wadman, J. Chem. Soc., 3051–3055, 1952.

MORRIS O. WOLK, Primary Examiner

S. MARANTZ, Assistant Examiner

U.S. Cl. X.R.

99—142; 127—29